United States Patent Office.

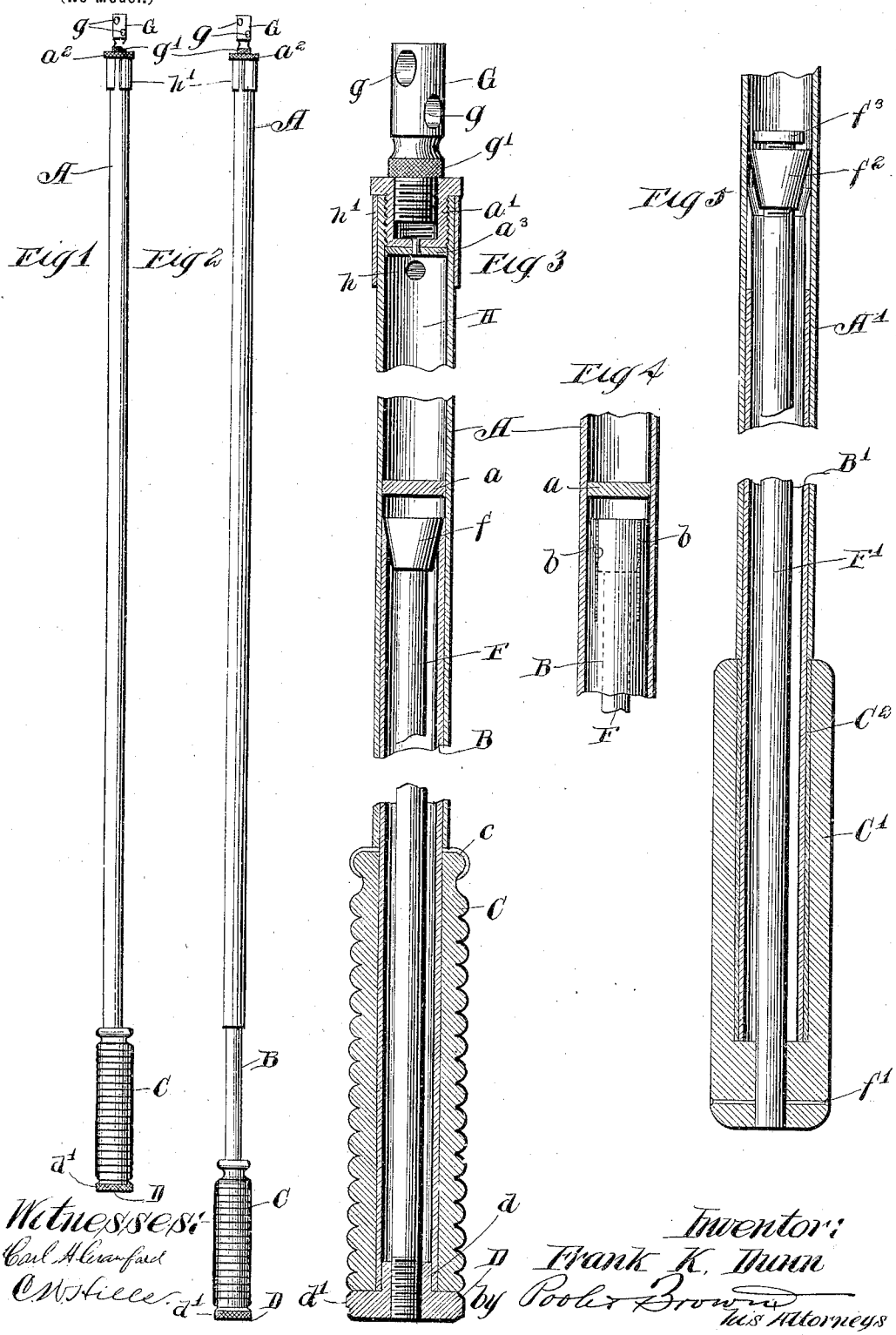

FRANK K. DUNN, OF CHICAGO, ILLINOIS.

CLEANING-ROD FOR FIREARMS.

SPECIFICATION forming part of Letters Patent No. 652,096, dated June 19, 1900.

Application filed March 21, 1900. Serial No. 9,488. (No model.)

*To all whom it may concern:*

Be it known that I, FRANK K. DUNN, of Chicago, in the county of Cook and State of Illinois, have invented certain new and useful Improvements in Cleaning-Rods for Firearms; and I do hereby declare that the following is a full, clear, and exact description thereof, reference being had to the accompanying drawings, and to the letters of reference marked thereon, which form a part of this specification.

This invention relates to improvements in cleaning-rods for firearms.

The primary object of the invention is to produce a rod of convenient size and length to be carried conveniently within the gun-barrel, but which may be extended or lengthened when it is desired to use the same for the purpose of wiping or cleaning the bore of the gun.

The invention primarily will be used in connection with shotguns.

Another object of the invention is to provide an oil-cup conveniently located at the end of the cleaning-rod.

The invention consists in the matters herein described, and more particularly pointed out and defined in the appended claims.

In the drawings, Figure 1 is a view illustrating my improved cleaning-rod. Fig. 2 is a similar view showing the same partially extended. Fig. 3 is a view in central longitudinal section of the same, somewhat enlarged. Fig. 4 is a longitudinal sectional view of a portion of the rod, showing the inner tube in elevation. Fig. 5 is a central longitudinal sectional view of a modified form of the invention.

As shown in the drawings, the cleaning-rod proper consists of telescoping parts or tubes A and B, of which the latter, B, is longitudinally movable within the outer case or tube A. C is one portion of a handle which surrounds the lower end of said tube B, and is secured thereto by means of the ferrule $c$.

D is a screw-threaded nut forming the outer end of the handle and rotatable within the end of the inner telescopic tube B. The said nut comprises a cylindric portion $d$, adapted to fit into the outer end of said tube B, and is provided with an annular flange $d'$ at its outer end having a diameter equal to that of the handle C. A clamping-rod E, having approximately the length of the tube B and contained within the same, is provided at its inner end with a tapered or conical locking member $f$. The outer end of said clamping-rod F is screw-threaded to afford engagement with said nut D, whereby the said rod and locking member are actuated longitudinally of the tubes A and B. The inner end of said tube B is provided with a plurality of longitudinal slits $b$, which extend inwardly from the extremity thereof. The inner portions of said tubes between said slits $b$ are tapered and are adapted to register with and be engaged by the tapered surface of the conical locking member $f$ when the latter is drawn inwardly by the rotation of the nut D to the position indicated in Fig. 4 of the drawings, in which the parts are shown in locked relation, the locking-head being shown in dotted lines. It is manifest that when said locking member $f$ is drawn within the split tapered end of the inner tube B the annular faces thereof engage each other with a wedging action and the tapered split ends of the inner tube B are forced outwardly and clamped firmly against the interior of the outer tube A, whereby said tubes are rigidly locked together.

When it is desired to release the parts A and B from the locked relation for purposes of adjustment or otherwise, the nut D at the end of the handle is rotated backwardly, and by reason of its engagement with the threaded end of the clamping-rod F the latter is forced inwardly or in a direction away from the handle, so that its tapered head or locking member $f$ releases its clamping action upon the slit end of the tube B, whereupon by grasping the tube A with one hand and the handle C with the other the tubes A and B may be drawn apart to the required distance. The nut D may now be turned forwardly, with the effect of again drawing the locking member $f$ into the slit end of the tube B, thereby locking said tubes A and B at the desired point.

Within the outer end of the rod A, as clearly shown in Fig. 3, is located an oil-cup H. Said oil cup or receptacle is formed as follows:

In the said outer tube A, near the extremity thereof, is provided a fluid-tight partition $a$, extending transversely across the same and so located that when the tubes are telescoped one within the other the said partition will be in close proximity to the upper end of the tube B. The extremity of the said tube A is provided with internal screw-threads adapted to receive the plug $a'$, which is provided with external screw-threads, complemental to the screw-threads in the end of said rod A, and is adapted to form a closure for the end of said rod. Said plug is provided at its outer end with a radial milled flange $a^2$, which projects laterally of the said tube a sufficient distance to be conveniently adapted for manual engagement. Said plug $a'$ is also provided with a central screw-threaded socket adapted to receive the screw-threaded end of the cleaning-block G, as illustrated in Figs. 2 and 3. For the purpose of preventing the escape of oil from the said oil-receptacle H the said plug $a'$ is provided at its inner end with a leather or other fibrous or resilient washer $a^3$, adapted to fit tightly within the inner end of said tube and to form a packing at the inner end of said plug. Said washer may be secured to the inner end of said plug in any convenient manner, as shown. However, the same is secured thereto by means of a central rivet $a^4$. The cleaning-block G is of familiar form and is provided at its outer end with rag-holes $g$ $g$, adapted to receive the wiping-cloths with which the gun is to be cleaned. Adjacent to the screw-threaded end of said cleaning-block a milled flange $g'$ is provided, the same being adapted to jam against the outer end of said plug $a'$ when the cleaning-block is screwed therein. The milled portion of said flange is designed to afford frictional engagement with the hands, whereby the cleaning-block may be readily unscrewed from the end of said wiping-rod. The oil-aperture $h$ of the said oil-receptacle, as shown, is situated below the said plug $a$ and closely adjacent thereto. A resilient closure for the said aperture is provided, herein shown to be a split ferrule $h'$ of sufficient length to extend from the said flange $a^2$ of the plug downwardly to entirely cover said aperture $h$, as clearly illustrated in Fig. 3. Said split ferrule $h'$ may be rotated upon the said tube A until the slot or slit therein registers with the said aperture, thereby permitting the escape of oil, or the same may be slid downwardly on the said bar, thereby uncovering the said aperture. It is designed that the said slit ferrule shall fit so closely upon the tube as to effectually prevent the escape of oil except in the case of one of the adjustments mentioned. Obviously the oil-receptacle may be filled either from the vent-aperture $h$ or the plug $a'$ may be removed and the oil-receptacle may be filled from the outer end of the tube in a familiar manner.

Obviously the device illustrated in Figs. 1, 2, and 3 show but one of several forms of my invention. Fig. 5 illustrates another form of my invention. In this form two telescopic tubes A' B' are shown, similar in all respects to the tubes A and B illustrated in Figs. 1, 2, and 3. The smaller tube B' is provided with a slit end and is adapted to slide inside of the larger tube A', as before described. The clamping-rod F' having approximately the same length as the tube B' is located within the same and is provided at its upper end with a clamping member $f^2$, which in this instance is shown as having screw-threaded engagement with the upper end of said clamping-rod F'. The handle C' is similar to the handle C, heretofore described. The clamping-rod F' is rigidly secured at its lower end to said handle C' by means of a transverse bolt or rivet $f'$, herein shown as passing through said handle and through an aperture in the rod F'. The handle C', as shown, is provided with a longitudinal central bore of greater diameter than the diameter of the tube B', and a ferrule $C^2$ is rigidly secured therein. Said ferrule $C^2$ has an inner diameter approximately equal to the outer diameter of the tube B', so that the said tube will readily slide or rotate therein. The operation of this form of my device is as follows: The conical locking member $f^2$ having been screwed downwardly on the said inner rod F' until the same rests lightly between the tapered ends of the tube B', the tube A' is passed over the same and slides downwardly until the desired point of adjustment is reached. If the tube B' be now grasped firmly with the hand and the handle C' rotated forwardly, it will cause rotation in the rod F'. The friction of the said conical locking member $f^2$ against the tapered sides of the tube B' will hold the same from rotation, while the continued rotation of the rod F' will cause the said locking member to be drawn downwardly into the end of the said tube, thereby wedging the split ends thereof outwardly against the inner sides of the tube A'. To release the said tubes from said locking engagement, said handle may be rotated in the reverse direction. Obviously, however, it is not essential that the said handle be rotated at all, inasmuch as the said handle and the tube B' may be drawn oppositely, thereby drawing the said locking-head $f^2$ into locking engagement with the parts, as before described. When it is desired to release the said tubes from said locked relation, it will be necessary only to push the said handle C' upwardly on the said tube B', whereby the rod F', being rigidly secured in the handle, is also pushed upwardly in the said tube, with the effect of forcing the said locking member $f^2$ out of its engagement with the tapered ends of the said tube.

As a further improvement in the embodiment of my device I provide a washer or stop $f^3$, rigidly secured at the upper ends of said rod F′ and designed to limit the movement of the said locking member $f^2$ upon the said rod F′.

I claim as my invention—

1. A cleaning-rod, comprising two tubes, one of which telescopes within the other, and means to lock said tubes at any desired point of adjustment.

2. An extensible cleaning-rod, comprising two tubes one of which slides within the other, a handle on one of said tubes, and means operated by movement of a part of said handle with respect to one of said tubes whereby said tubes may be locked at any desired point of adjustment.

3. An extensible cleaning-rod, comprising two telescoping tubes, a handle on one of said tubes and means operated by movement of a part of said handle with respect to the tube on which it is secured, whereby said tubes may be locked at any desired point.

4. An extensible cleaning-rod, comprising an outer and an inner tube, the inner end of said inner tube being longitudinally slit or divided, and a conical wedging member located in juxtaposition to said slit end and adapted to be drawn within said inner tube whereby the split ends thereof are wedged into locking engagement with said outer tube.

5. The combination with an outer tube, of an inner tube sliding therein and provided with a handle on one end, the other end of said inner tube being slit or longitudinally divided, a clamping-rod extending through said inner tube and secured at one of its ends to said handle, a conical locking member secured to the other end of said clamping-rod and means operated by movement of a part of said handle with respect to one of said tubes acting to draw said locking member into operative engagement with the slit ends of said inner tube.

6. In a gun-cleaner, the combination with an outer tube, of an inner tube sliding therein and provided at its inner end with a plurality of longitudinal slits, a handle on the outer end of one of said tubes, a tapered locking member located within the slit end of said inner tube and means for moving said locking member longitudinally of said inner tube whereby the latter may be rigidly locked to said outer tube.

7. In a gun-cleaner, the combination with an outer tube, of an inner tube sliding therein, a plurality of longitudinal slits in the inner end of said inner tube the parts of said inner tube between said slits being tapered on the inner side thereof, a handle on the outer end of said inner tube, a tapered locking member located within and adapted to engage the tapered surfaces of said slit end of said inner tube and means operated by movement of a part of the handle with respect to said inner tube acting to draw said locking member into operative engagement with the split ends of said tube.

8. The combination with an outer tube, of an inner tube sliding therein having at its inner ends a plurality of longitudinal slits and having the portions between said slits tapered outwardly, a handle secured on the outer end of said inner tube, a clamping-rod approximately the same length as and located within said inner tube, a tapered clamping member on said clamping-rod and adapted to engage the tapered surfaces of said inner tube, a nut at the outer end of said clamping-rod having screw-threaded engagement therewith and bearing against the outer end of the handle, means for rotating said nut on said clamping-rod whereby said clamping-rod and clamping member are moved longitudinally of said inner tube into or out of locking engagement therewith.

9. An extensible cleaning-rod, comprising an outer tube, and inner tube sliding therein, and having its inner end dilatable, means for dilating said inner end into clamping engagement with the outer tube, a handle on the outer end of one tube, and an oil-receptacle in the outer end of the other tube, a socketed plug adapted to close said outer end of the said tube and the oil-receptacle, and an apertured cleaning-block adapted to have screw-threaded engagement with said plug.

10. An extensible wiping-rod, comprising an outer and inner tube, clamping means in said tubes whereby the same may be locked in any desired adjustment, an oil-receptacle provided with a lateral vent in the outer end of one of said tubes, a socketed plug to close said oil-receptacle having screw-threaded engagement with the said outer tube, and a washer or packing of leather or the like adapted to be secured at the inner end of said plug, an apertured cleaning-block having screw-threaded engagement with the socket of said plug, and a closure for the vent-aperture of said oil-receptacle movably positioned on the outer tube comprising a split band or ferrule encircling the outer end of said outer tube whereby the same may be adjusted to cover or expose said oil-aperture.

In testimony that I claim the foregoing as my invention I affix my signature, in presence of two witnesses, this 19th day of March, A. D. 1900.

FRANK K. DUNN.

Witnesses:
C. W. HILLS,
TAYLOR E. BROWN.